US012523905B2

(12) United States Patent
Noguchi et al.

(10) Patent No.: US 12,523,905 B2
(45) Date of Patent: Jan. 13, 2026

(54) DISPLAY APPARATUS COMPRISING A LENS UNIT HAVING A LIGHT ENTERING SURFACE WITH A CONCAVE SURFACE

(71) Applicant: Japan Display Inc., Tokyo (JP)

(72) Inventors: Michikazu Noguchi, Tokyo (JP); Yasuyuki Hanazawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 328 days.

(21) Appl. No.: 18/222,545

(22) Filed: Jul. 17, 2023

(65) Prior Publication Data

US 2024/0027827 A1    Jan. 25, 2024

(30) Foreign Application Priority Data

Jul. 19, 2022    (JP) .................................. 2022-115066

(51) Int. Cl.
*G02F 1/13357*    (2006.01)
*F21V 8/00*    (2006.01)
*G02B 27/01*    (2006.01)

(52) U.S. Cl.
CPC .......... *G02F 1/1336* (2013.01); *G02B 6/0073* (2013.01); *G02B 27/0101* (2013.01); *G02F 2203/01* (2013.01)

(58) Field of Classification Search
CPC ....................... G02F 2203/01; G02F 1/133616
See application file for complete search history.

(56) References Cited

U.S. PATENT DOCUMENTS

| 2008/0170173 | A1* | 7/2008 | Park ................... G02F 1/133621 349/62 |
| 2012/0268656 | A1* | 10/2012 | Takano .................. G02B 6/003 362/602 |
| 2019/0302343 | A1* | 10/2019 | Okuyama ............ G02B 6/0046 |
| 2021/0223465 | A1* | 7/2021 | Numata ............... G02B 6/0088 |

FOREIGN PATENT DOCUMENTS

JP    2019-174530 A    10/2019

* cited by examiner

*Primary Examiner* — Paul C Lee
(74) *Attorney, Agent, or Firm* — Michael Best & Friedrich LLP

(57) ABSTRACT

A display apparatus includes: a light guide panel; a light source unit including a plurality of light emitting diode elements arranged in an X direction at a position facing a side surface of the light guide panel; and a lens unit arranged between the light guide panel and the light source unit. The light source unit, the lens unit and the light guide panel are arranged in a Y direction crossing the X direction. The lens unit includes: a light entering surface facing the light source unit; and a light emitting surface being opposite to the light entering surface and facing the side surface of the light guide panel. The light entering surface of the lens unit is a concave surface extending in the X direction.

5 Claims, 10 Drawing Sheets

DISPLAY APPARATUS COMPRISING A LENS UNIT HAVING A LIGHT ENTERING SURFACE WITH A CONCAVE SURFACE

CROSS-REFERENCE TO RELATED APPLICATION

The present application claims priority to Japanese Patent Application No. 2022-115066 filed on Jul. 19, 2022, the disclosure of which is incorporated herein by reference.

TECHNICAL FIELD OF THE INVENTION

The present invention relates to a display apparatus using a liquid crystal layer.

BACKGROUND OF THE INVENTION

There are display apparatuses in each of which a light guide member functioning as a lens is arranged between a plurality of light emitting diode elements and the light guide panel. For example, Japanese Patent Application Laid-Open Publication No. 2019-174530 (Patent Document 1) describes a display apparatus in which a light guide member is arranged between a light emitting unit and an end of a second substrate.

RELATED ART DOCUMENT

Patent Document

Patent Document 1: Japanese Patent Application Laid-Open Publication No. 2019-174530

SUMMARY OF THE INVENTION

The inventors of the present application have developed a transparent display apparatus allowing an observer to recognize a display image and a background while overlapping the display image and the background. Such a transparent display apparatus needs to have a property of a front surface and a back surface, each of which transmits visible light. Therefore, a light source unit for displaying images is arranged on a side surface of the light guide panel. In order to widely diffuse light emitted from the light source unit, a lens is preferably arranged between the light guide panel and the light source unit. However, in only the arrangement of the lens between the light guide body and the light source unit, the light emitted from the light source unit is occasionally not efficiently utilized. For example, occasionally, the light entering almost vertically a light entering surface of the light guide panel reaches an opposite side of the light entering surface of the light guide panel, but does not reach a liquid crystal layer for diffusing the light. In this case, the light not reaching the liquid crystal layer becomes loss light incapable of contributing to the display.

A display apparatus according to an embodiment of the present invention includes: a first substrate including a first front surface and a first back surface opposite to the first front surface; a liquid crystal layer arranged on the first front surface of the first substrate; a light guide panel including a first surface facing the first front surface, a second surface opposite to the first surface, and a first side surface crossing the first surface and the second surface; a light source unit including a plurality of light emitting diode elements arranged in a first direction at a position facing the first side surface of the light guide panel; and a lens unit arranged between the light guide panel and the light source unit. The light source unit, the lens unit and the light guide panel are arranged in a second direction crossing the first direction. The lens unit includes: a light entering surface facing the light source unit; and a light emitting surface being opposite to the light entering surface and facing the first side surface of the light guide panel. The light entering surface of the lens unit is a concave surface extending in the first direction.

A display apparatus according to another embodiment of the present invention includes: a first substrate including a first front surface and a first back surface opposite to the first front surface; a liquid crystal layer arranged on the first front surface of the first substrate; a light guide panel including a first surface facing the first front surface, a second surface opposite to the first surface, and a first side surface crossing the first surface and the second surface; a light source unit including a plurality of light emitting diode elements arranged in a first direction at a position facing the first side surface of the light guide panel; and a lens unit arranged between the light guide panel and the light source unit. The light source unit, the lens unit and the light guide panel are arranged in a second direction crossing the first direction. The lens unit includes: a light entering surface facing the light source unit; and a light emitting surface being opposite to the light entering surface and facing the first side surface of the light guide panel. The light emitting surface of the lens unit is a convex surface extending in the first direction.

BRIEF DESCRIPTIONS OF THE DRAWINGS

DESCRIPTIONS OF THE PREFERRED EMBODIMENTS

Figure 1:
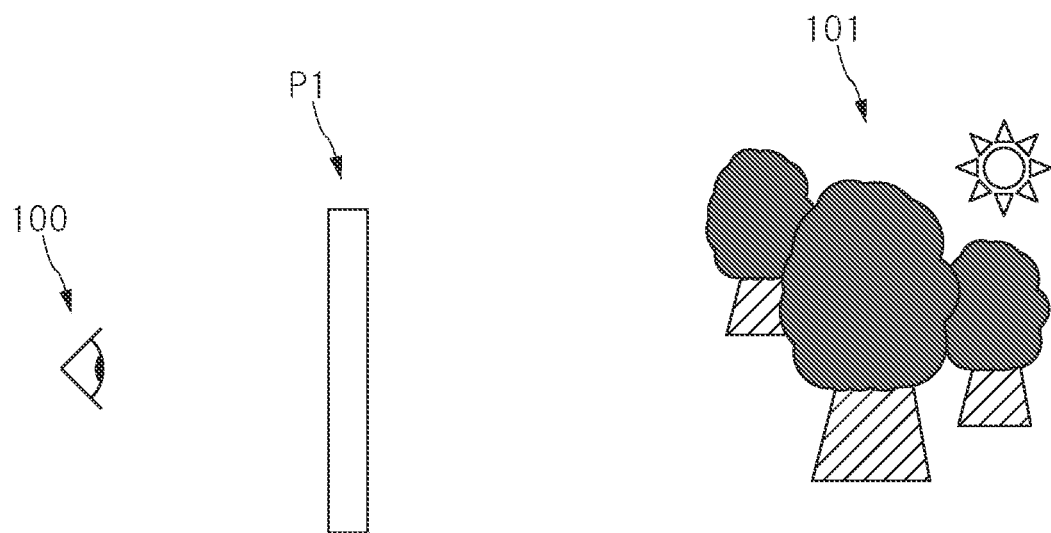
FIG. 1 is an explanatory diagram showing a positional relation in a case in which a viewer on one surface side of a transparent display panel apparatus visually recognizes a background on the other side through the transparent display panel apparatus.

The following is explanation for each embodiment of the present invention with reference to drawings. Note that disclosure shows only one example, and appropriate modification with keeping the concept of the present invention which can be easily anticipated by those skilled in the art is obviously within the scope of the present invention. Also, in order to make the clear description for drawings, a width, a thickness, a shape, and others of each portion in the drawings are schematically illustrated more than those in an actual aspect in some cases. However, the illustration is only one example, and does not limit the interpretation of the present invention. In the present specification and each drawing, similar elements to those described earlier for the already-described drawings are denoted with the same or similar reference characters, and detailed description for them is appropriately omitted in some cases.

In the following embodiments, a liquid crystal display apparatus displaying images by using visible light scattering made by liquid crystal molecules will be exemplified and explained as an example of a display panel used in combination with a glass panel.

And, the liquid crystal display apparatus is an apparatus that forms the display images by changing orientation of molecules contained in a liquid crystal layer, and needs a light source. In the embodiments explained below, the light source is arranged separately from the display panel. Therefore, the display panel and a light source module that supplies the visible light to the display panel will be explained to be distinguished from each other.

<Transparent Display Panel>

Figure 2:
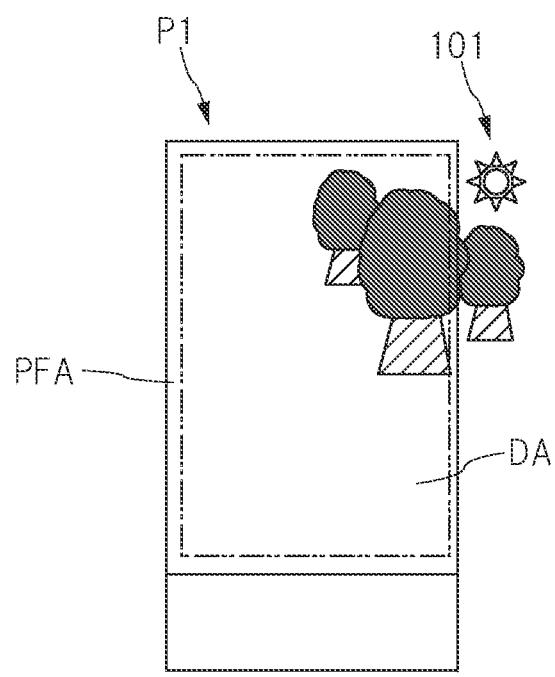
FIG. 2 is an explanatory diagram showing an example of the background visually recognized through the transparent display panel apparatus.

First, a feature of so-called transparent display panel will be explained. FIG. 1 is an explanatory diagram showing a positional relation in a case in which a viewer on one surface side of a transparent display panel visually recognizes a background on the other side through the transparent display panel. FIG. 2 is an explanatory diagram showing an example of the background visually recognized through the transparent display panel.

When an observer 100 looks at the other side from one side of a display panel P1 as shown in FIG. 1, a background 101 is visually recognized through the display panel P1. When both a display region DA and a peripheral region PFA outside the display region DA transmit the light as shown in FIG. 2, the observer can visually recognize the entire background 101 without uncomfortable feeling. On the other hand, when the peripheral region PFA has a light blocking property not transmitting the light, a part of the background 101 to be visually recognized through the display panel P1 is blocked by the peripheral region PFA, and therefore, occasionally makes the observer 100 (see FIG. 1) uncomfortable. In the case of the display panel P1 that is the transparent display panel as described above, each of the display region DA and the peripheral region PFA preferably has a property allowing visible light to penetrate therethrough. And, in a viewpoint of the visual recognition of the background 101 without the uncomfortable feeling, the display region DA and the peripheral region PFA are particularly preferable to be almost the same as each other in the property allowing the visible light to penetrate therethrough.

Figure 3:
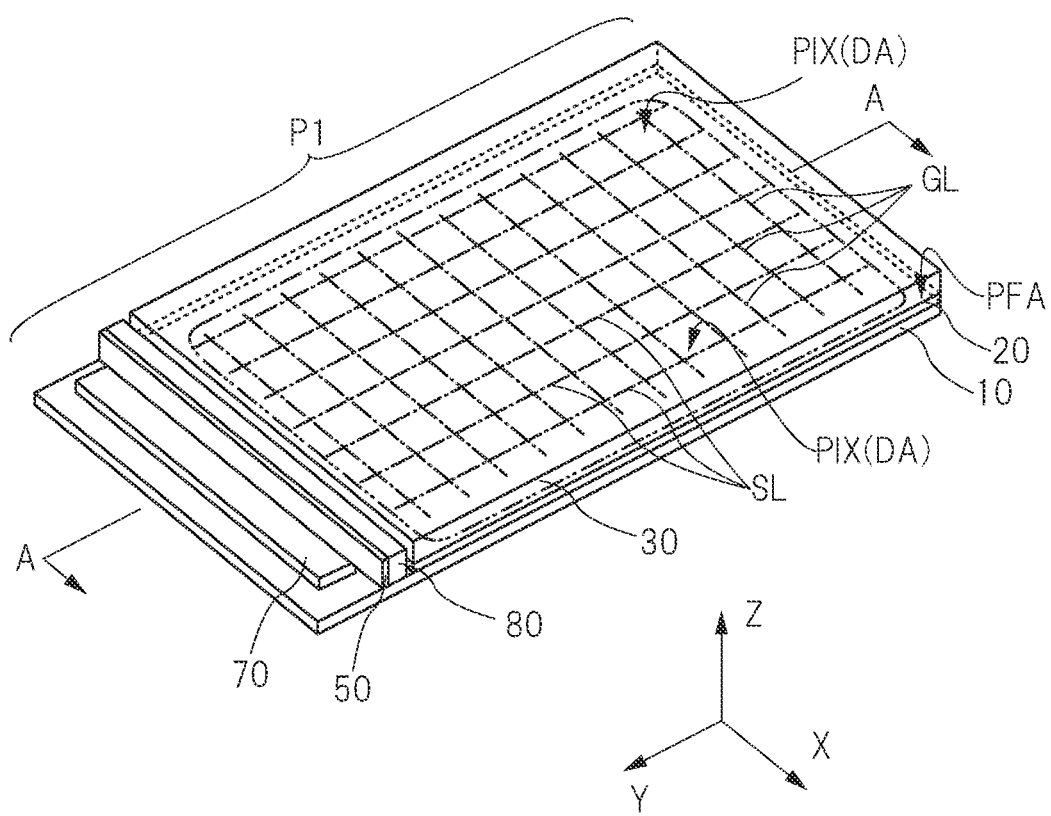
FIG. 3 is a perspective view showing an example of a transparent display panel shown in FIG. 1.
Figure 5:
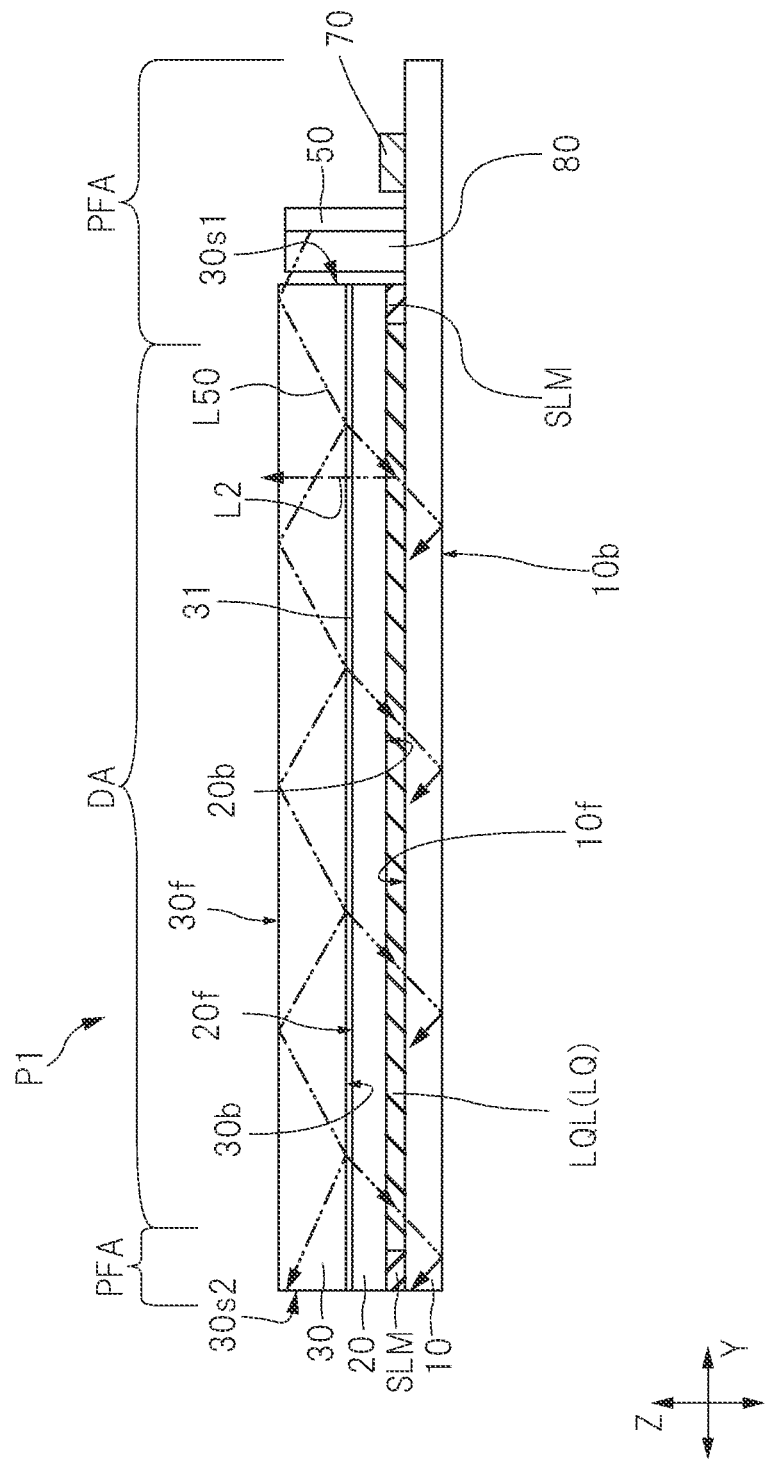
FIG. 5 is a cross-sectional view taken along a line A-A of FIG. 3.
Figure 6:
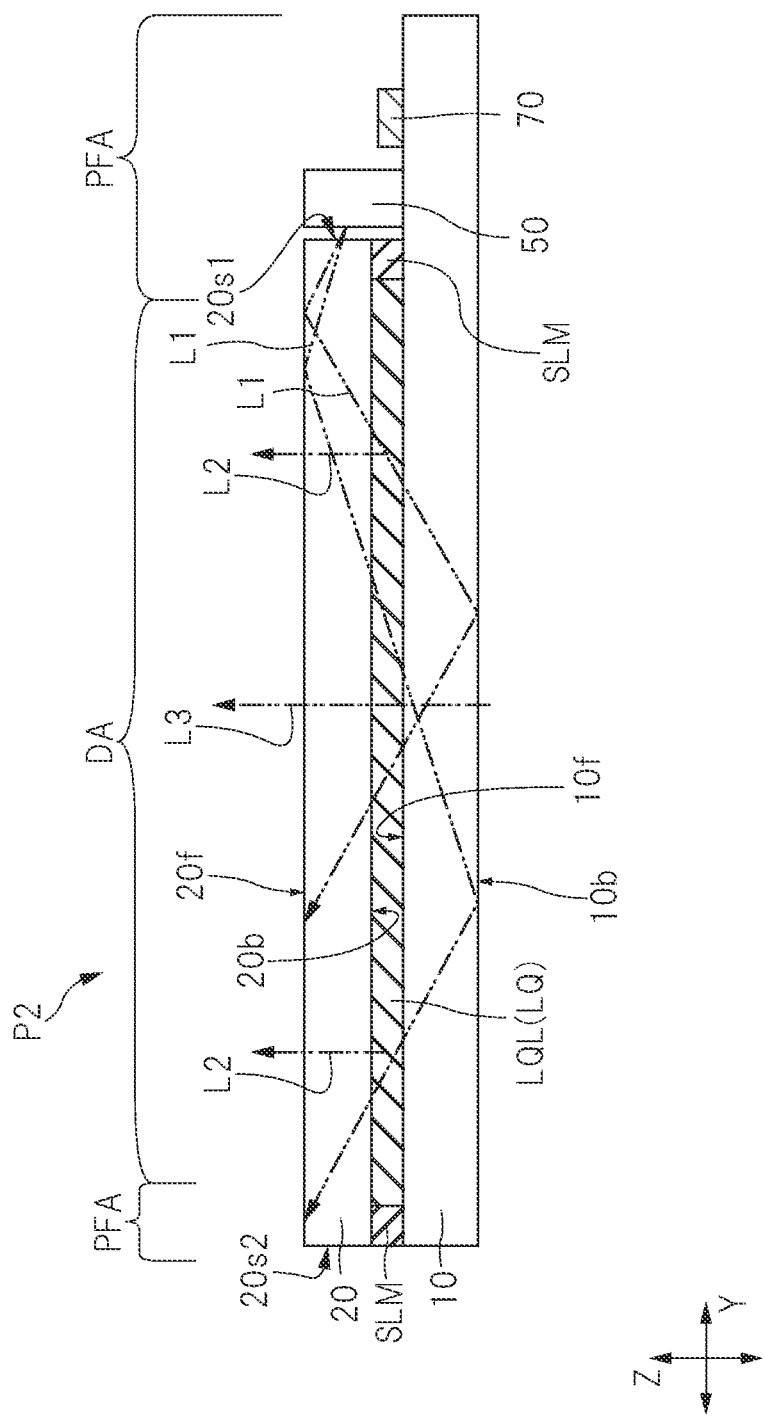
FIG. 6 is an explanatory diagram schematically showing a path of light emitted from a light source unit of a transparent display apparatus according to a study example.

FIG. 3 is a perspective view showing an example of a transparent display panel shown in FIG. 1. In FIG. 3, a boundary between the display region DA and the peripheral region PFA is illustrated with a dashed double-dotted line. And, in FIG. 3, of a circuit included in the display panel P1, some (specifically a gate line GL and a source line SL) of signal wirings transmitting signals for driving the liquid crystal are schematically illustrated with a dashed dotted line. The following drawings including FIG. 3 will be explained so that a direction along a thickness direction of the display panel P1 is a "Z" direction, an extension direction of one side of the display panel P1 on an X-Y plane orthogonal to the Z direction is an "X" direction, and a direction crossing the X direction is a "Y" direction. FIG. 5 is a cross-sectional view taken along a line A-A of FIG. 3. FIG. 6 is an explanatory diagram schematically showing a path of light emitted from a light source unit of a transparent display apparatus according to a study example.

As shown in FIG. 3, the display panel P1 of the present embodiment includes a substrate (array substrate) 10, a substrate (counter substrate) 20, a light guide panel (also referred to as first light guide panel or first cover glass) 30, a light source unit (first light source unit) 50, a driver circuit 70 and a lens unit 80.

A configuration as the display apparatus may include, for example, a control circuit, a flexible board connected to the display panel P1, an enclosure or others in addition to each unit of the display panel P1 shown in FIG. 3. In FIG. 3, illustration of other units than the display panel P1 is omitted.

The display panel P1 includes the display region DA where an image is formed in response to an input signal fed from the outside, and a peripheral region (frame region) PFA located around the display region DA. Note that the display region DA of the display panel P1 shown in FIG. 3 has a quadrangular shape. However, the display region may have a shape such as a polygonal shape or a circular shape other than the quadrangular shape. In plan view in which a display surface is viewed, the display region DA is an effective region where the display panel P1 displays the image. Each of the substrates 10 and 20 and the light guide panel 30 is at a position overlapping the display region DA in plan view. In the example shown in FIG. 1, each of the light source unit 50, the driving circuit 70 and the lens unit 80 is mounted on the substrate 10. However, as a modification example, occasionally, a substrate used for light source but not illustrated as separated from the substrate 10 may be arranged as a member separated from the display panel P1, and the light source unit 50 and the lens unit 80 may be mounted on the substrate used for light source but not illustrated.

Figure 4:
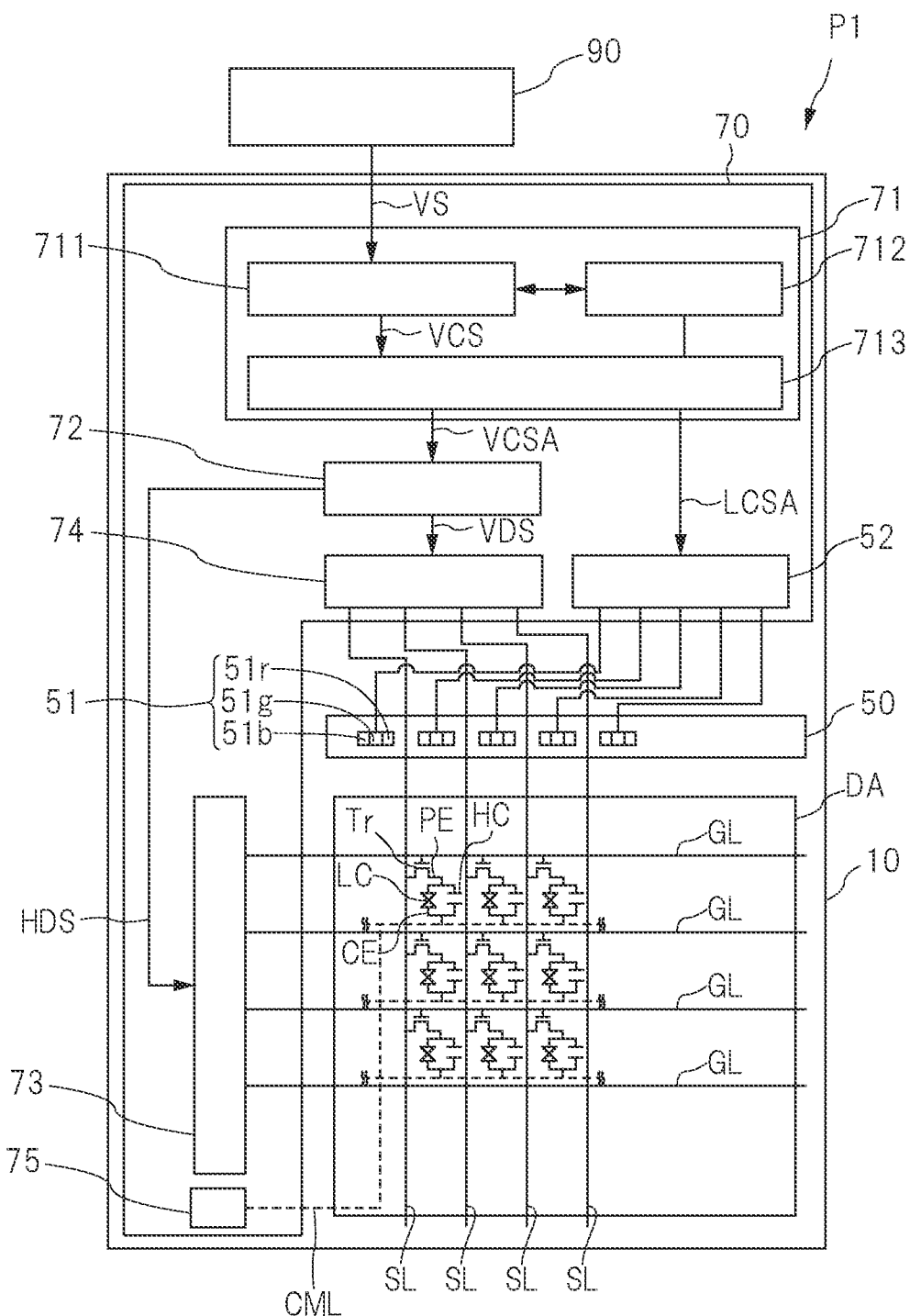
FIG. 4 is a circuit block diagram showing an example of a circuit included in a display panel of FIG. 3.

First, a configuration example of the circuit included in the display panel P1 shown in FIG. 3 will be explained. FIG. 4 is a circuit block diagram illustrating an example of the circuit included in the display panel of FIG. 3. A wiring path connected to a common electrode CE shown in FIG. 4 is formed on, for example, the substrate 20 shown in FIG. 5 described later. In FIG. 4, wirings formed on the substrate 20 are illustrated with dotted lines. In the example shown in FIG. 4, a light source control unit 52 is included in the driving circuit 70. As a modification example, the light source unit 50 and the light source control unit 52 may be provided separately from the driving circuit 70. As described above, the substrate used for light source but not illustrated as separated from the substrate may be arranged as a member separated from the display panel P1, and the light source unit 50 may be mounted on the substrate used for light source but not illustrated. In this case, the light source control unit 52 is formed in, for example, the substrate used for light source but not illustrated. Alternatively, the light source control unit 52 is formed in an electronic component mounted on the substrate used for light source but not illustrated.

In the example shown in FIG. 4, the driving circuit 70 includes a signal processing circuit 71, a pixel control circuit 72, a gate driving circuit 73, a source driving circuit 74, and a common potential driving circuit 75. The light source unit 50 includes, for example, a light emitting diode element 51r, a light emitting diode element 51g and a light emitting diode element 51b. Note that combination of the light emitting diode element 51r, the light emitting diode element 51g and the light emitting diode element 51b will be described in detail later. Since the substrate 10 has a larger area than the substrate 20 as shown in FIG. 3, the driving circuit 70 is provided on the substrate 10.

The signal processing circuit 71 includes an input signal analyzing unit (input signal analyzing circuit) 711, a storage unit (storage circuit) 712, and a signal adjusting unit 713. The display panel P1 includes a control unit 90 including a control circuit that controls the image display. An input signal VS is input from the control unit 90 to the input signal analyzing unit 711 of the signal processing circuit 71 through a wiring path such as a flexible wiring board not illustrated. The input signal analyzing unit 711 performs an analyzing process on the basis of the input signal VS input thereto from the outside to generate an input signal VCS. The input signal VCS is, for example, a signal that determines, based on the input signal VS, a gradation value given to each pixel PIX (see FIG. 3) of the display panel P1 (see FIG. 3).

The signal adjusting unit 713 generates an input signal VCSA from the input signal VCS input thereto from the input signal analyzing unit 711. The signal adjusting unit 713 transmits the input signal VCSA to the pixel control circuit 72, and transmits a light source control signal LCSA to the light source control unit 52. The light source control signal LCSA is, for example, a signal containing information about light quantity of the light source unit 50 set in accordance with the gradation value input to the pixel PIX.

The pixel control circuit 72 generates a horizontal driving signal HDS and a vertical driving signal VDS on the basis of the input signal VCSA. For example, in the present embodiment, since a field sequential driving method is performed, the horizontal driving signal HDS and the vertical driving signal VDS are generated for each color, light of which can be emitted by the light source unit 50. The gate driving circuit 73 sequentially selects the gate lines GL of the display panel P1 (see FIG. 3) within one vertical scanning period on the basis of the horizontal driving signal HDS. A selection order of the gate lines GL is optional. As shown in FIG. 3, the plurality of gate lines (signal wirings) GL extend in the X direction, and are arrayed in the Y direction.

To each source line SL of the display panel P1 (see FIG. 3), the source driving circuit 74 feeds a gradation signal corresponding to an output gradation value of each pixel PIX (see FIG. 3) within one horizontal scanning period on the basis of the vertical driving signal VDS. As shown in FIG. 3, the plurality of source lines (signal wirings) SL extend in the Y direction, and are arrayed in the X direction. One pixel PIX is formed for each intersection between the gate lines GL and the source lines SL. The switching element Tr (see FIG. 4) is formed at each intersection between the gate lines GL and the source lines SL. The plurality of gate lines GL and source lines SL shown in FIGS. 3 and 4 correspond to the plurality of signal wirings that transmit the driving signals for driving the liquid crystal LQ shown in FIG. 5 (and FIG. 6) described later.

For example, a thin-film transistor is used as the switching element Tr shown in FIG. 4. The type of the thin-film transistor is not limited to any particular type, and, for example, the followings are exemplified: In classification based on a gate position, a bottom-gate transistor and a top-gate transistor are exemplified. Also, in classification based on the number of gates, a single-gate thin-film transistor and a double-gate thin-film transistor are exemplified. One of a source electrode and a drain electrode of the switching element Tr is connected to the source line SL, a gate electrode is connected to the gate line GL, and the other of the source electrode and the drain electrode is connected to one end of a capacitor of the polymer diffused liquid crystal LC (the liquid crystal LQ shown in FIGS. 5 and 6). One end of the capacitor of the polymer diffused liquid crystal LC is connected to the switching element Tr though a pixel electrode PE, and the other end is connected to a common potential wiring CML through the common electrode CE. A holding capacitor HC is generated between the pixel electrode PE and a holding capacitor electrode electrically connected to the common potential wiring CML. Note that the common potential wiring CML is supplied by the common potential driving circuit 75.

Next, a light path of the light emitted from the light source unit 50 in the display panel P1 shown in FIG. 3 will be explained. For simple explanation, the explanation will be made with reference to a display panel P2 having a simplified structure as shown in FIG. 6. Note that the display panel P2 shown in FIG. 6 is the same as the display panel P1 shown in FIG. except that the light guide panel 30 is not included. In the case of the display panel P2, the substrate 20 is used as the light guide panel. Therefore, the following explanation for the display panel P2 is also applicable to the display panel P1 shown in FIG. 5.

As shown in FIG. 6, the display panel P2 includes the substrate 10 and the substrate 20 adhered together to face each other while sandwiching a liquid crystal layer LQL therebetween. The substrate 10 and the substrate 20 are arrayed in the Z direction which is the thickness direction of the display panel P2. In other words, the substrate 10 and the substrate 20 face each other in the thickness direction (Z direction) of the display panel P2. The substrate 10 has a front surface (main surface, surface) 10f facing the liquid crystal layer LQL (and the substrate 20). The substrate 20 has a back surface (main surface, surface) 20b facing the front surface 10f of the substrate 10 (and the liquid crystal layer LQL). The substrate is an array substrate on which a plurality of transistors (transistor elements) serving as switching elements (active elements) Tr (see FIG. 4) are arrayed. The substrate 20 is a substrate provided on the display surface side. The substrate can also be interpreted as an opposing (counter) substrate meaning a substrate facing the array substrate.

The liquid crystal layer LQL containing liquid crystal LQ is located between the front surface 10f of the substrate 10 and the back surface 20b of the substrate 20. The liquid crystal layer LQL is an optical modulation element. The display panel P2 has a function of modulating the light passing therethrough by controlling a state of an electric field formed around the liquid crystal layer LQL via the switching elements described above. The display region DA on the substrate 10 and the substrate 20 overlaps the liquid crystal layer LQL as shown in FIG. 6.

Also, the substrate 10 and the substrate 20 are adhered to each other while sandwiching a seal portion (seal member) SLM therebetween. As shown in FIGS. 3 and 6, the seal portion SLM (see FIG. 6) is disposed in the peripheral region PFA to surround the display region DA. As shown in FIG. 6, the liquid crystal layer LQL is located inside the seal portion SLM. The seal portion SLM plays a role of a seal that seals the liquid crystal between the substrate 10 and the substrate 20. The seal portion SLM also plays a role of an adhesive by which the substrate 10 and the substrate 20 are adhered to each other.

The light source unit 50 is disposed at a position facing a side surface 20s1 of the substrate 20. As schematically illustrated with a dashed double-dotted line in FIG. 6, light-source light L1 emitted from the light source unit 50 propagates in a direction being away from the side surface 20s1 while being reflected by the back surface 10b of the substrate 10 and the front surface 20f of the substrate 20. In a propagation path of the light-source light L1, the back surface 10b of the substrate and the front surface 20f of the substrate 20 are boundaries each between a medium having a large refractive index and a medium having a small refractive index. Thus, when an incident angle of the light-source light L1 incident on the front surface 20f and the back surface 10b is larger than an optimum angle, the light-source light L1 is totally reflected on the front surface 20f and the back surface 10b.

The liquid crystal LQ is polymer diffused liquid crystal LC (see FIG. 4), and contains a liquid crystalline polymer and liquid crystal molecules. The liquid crystalline polymer is formed in stripes, and the liquid crystal molecules are diffused in gaps of the liquid crystalline polymer. Each of the liquid crystalline polymer and the liquid crystal molecules has optical anisotropy or refractive anisotropy. The responsiveness of the liquid crystalline polymer to the electric field is lower than the responsiveness of the liquid crystal molecules to the electric field. The orientation direction of the liquid crystalline polymer hardly changes regardless of the presence or absence of the electric field. On the other hand, when a high voltage equal to or higher than a threshold is applied to the liquid crystal LQ, the orientation direction of the liquid crystal molecules varies depending on the electric field. When the voltage is not applied to the liquid crystal LQ, the optical axes of the liquid crystalline polymer and the liquid crystal molecules are parallel to each other, and the light-source light L1 that has entered the liquid crystal layer LQL is hardly scattered in but transmitted through the liquid crystal layer LQL (transparent state). When the voltage is applied to the liquid crystal LQ, the optical axes of the liquid crystalline polymer and the liquid crystal molecules intersect each other, and the light-source light L1 that has entered the liquid crystal LQ is scattered in the liquid crystal layer LQL (scattered state). In the display panel P2, the transparent state and the scattered state are controlled by controlling the orientation of the liquid crystal LQ in the propagation path of the light-source light L1. In the scattered state, by the liquid crystal LQ, the light-source light L1 is emitted as emitted light L2 from the front surface 20f side to the outside of the display panel P2. Background light L3 that has entered from the back surface 10b side is transmitted through the substrate 10, the liquid crystal layer LQL and the substrate 20, and is emitted from the front surface 20f to the outside. The emitted light L2 and the background light L3 are visually recognized by the observer on the front surface 20f side. The observer can recognize the combination of the emitted light L2 and the background light L3. Such a display panel that enables the observer to recognize the combination of the display image and the background is called a transparent display panel.

The display panel P1 shown in FIG. 5 is different from the display panel P2 shown in FIG. 6 in that the light guide panel is arranged on the substrate 20, in that the lens unit 80 is arranged between the light guide panel 30 and the light source unit 50, and in that the light-source light L50 emitted from the light source unit 50 enters the liquid crystal layer LQL through the lens unit 80 and the light guide panel 30. The display panel (display apparatus) P1 includes the substrate 10 having a front surface 10f and a back surface 10b opposite to the front surface the substrate 20 having a back surface 20b facing the front surface 10f and a front surface 20f opposite to the back surface and the liquid crystal layer LQL arranged between the front surface 10f of the substrate 10 and the back surface 20b of the substrate 20. This point is the same as that of the display panel P2 shown in FIG. 6. The display panel P1 further includes the light guide panel 30 adhered and fixed onto the front surface of the substrate 20 so as to sandwich an adhesive layer 31 therebetween, and includes the light source unit 50 arranged on the front surface 10f of the substrate 10 at a position facing a side surface 30s1 of the light guide panel 30, and the lens unit 80 arranged between the light guide panel 30 and the light source unit 50.

The light guide panel 30 has a back surface 30b facing the front surface 20f of the substrate 20 and a front surface 30f opposite to the back surface 30b. Also, the light guide panel 30 has the side surface 30s1 facing the light source unit 50 while sandwiching the lens unit 80 therebetween, and a side surface 30s2 opposite to the side surface 30s1. The light guide panel 30 is adhered and fixed to the substrate 20 while sandwiching the adhesive layer 31 therebetween. At least in the display region DA, a gap between the light guide panel 30 and the substrate 20 is filled with the adhesive layer 31. In an example shown in FIG. 5, the adhesive layer 31 is adhered to the back surface 30b of the light guide panel 30 as a whole. The light-source light L50 emitted from the light source unit 50 is diffused by the lens unit 80, enters the light guide panel 30 through the side surface 30s1, and travels toward the side surface 30s2 while reflecting.

The adhesive layer 31 is made of a transparent resin material capable of transmitting the visible light. As examples of the adhesive layer 31 allowing the visible light to penetrate therethrough, a sheet-shaped transparent bonding sheet that is called Optical Clear Adhesive (OCA), an Optical Clear Resin (OCR) used by hardening of a liquid-type transparent adhesive and others are exemplified. Each refractive index of the substrates 10 and 20 and the light guide panel 30 includes various modification examples, but each refractive index is, for example, about 1.5. The refractive index of the adhesive layer 31 is, for example, about 1.37 to 1.5 close to the refractive index of the light guide panel 30.

Under the above-described conditions, a part of the light-source light L50 does not reflect on the boundary with the adhesive layer 31, but enters the substrate 20. The light having entered the substrate 20 travels toward the liquid crystal layer LQL as similar to the light-source light L1 shown in FIG. 6, and enters the liquid crystal layer LQL. The light having scattered in the liquid crystal layer LQL is emitted as the emitted light L2 to outside of the display panel P1 through the front surface 20f. On the other hand, the light not having scattered in the liquid crystal layer LQL is reflected on the back surface 10b of the substrate 10 and the front surface 20f of the substrate 20 (or the front surface 30f of the light guide panel 30), and propagates in a direction being away from the light-source unit 50.

<Structures of Light Source Unit and Lens>

Figure 7:
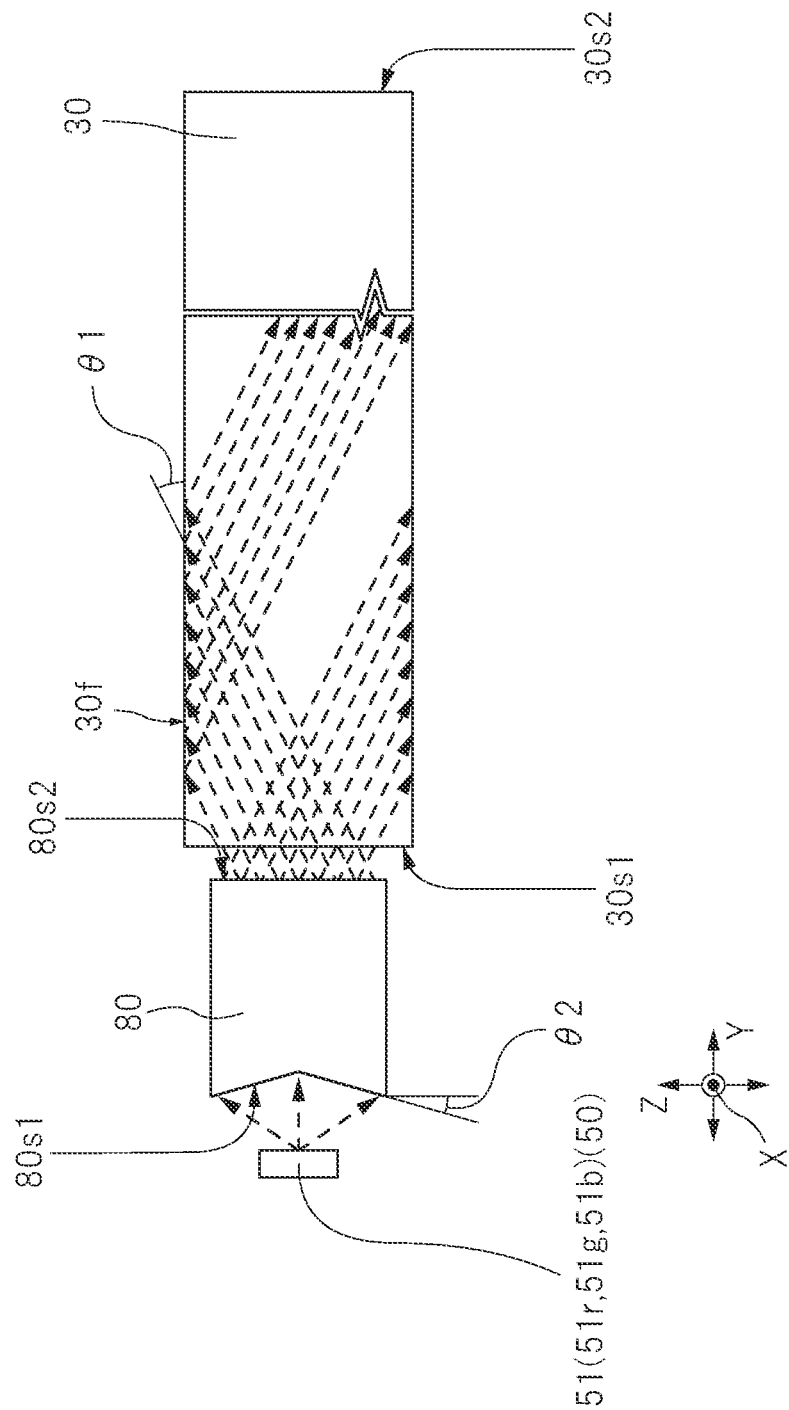
FIG. 7 is a cross-sectional view showing a structural example of a light source unit, a lens unit and a light guide body shown in FIG. 3.
Figure 8:
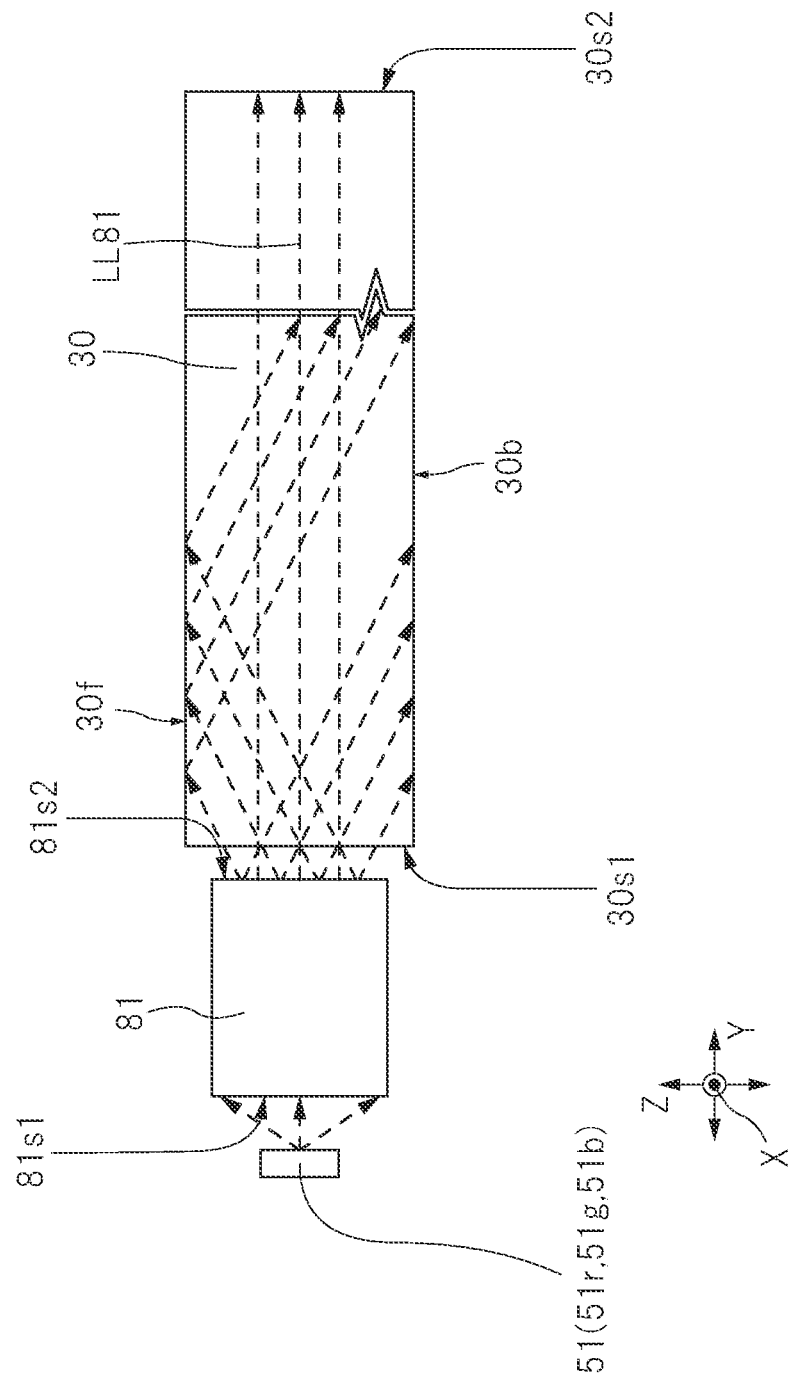
FIG. 8 is a cross-sectional view showing a study example compared to FIG. 7.

Next, structures of the light source unit and the lens will be explained. FIG. 7 is a cross-sectional view showing the structures of the light source unit, the lens unit and the light guide panel shown in FIG. 3. Although FIG. 7 is the cross-sectional view, hatching is omitted in order to make the light path easy to be recognized. The cross section shown in FIG. 7 is a cross section taken along a line A-A of FIG. 3, that is the same cross section as that of FIG. 5. FIG. 8 is a cross-sectional view showing a study example compared to FIG. 7. The following explanation will be made while taking an example in which the light guide panel 30 is arranged on the front surface side of the substrate 20, separately from the substrate 20 as shown in the display panel P1 in FIG. 5. Note that the following explained technique is also applicable to a usage case of the substrate 20 regarded as a light guide panel without the light guide panel 30 as shown in the display panel P2 in FIG. 6. In this case, the lens unit 80 shown in FIG. 5 is arranged between the light source unit 50 and the substrate 20 shown in FIG. 6. Further, this case is applicable even when the light guide panel 30 explained below is interpreted as the substrate 20.

As shown in FIG. 7, the light source unit 50, the lens unit and the light guide panel 30 are arrayed in the Y direction crossing the X direction. The lens unit 80 has a light entering surface 80s1 facing the light source unit 50; and a light emitting surface 80s2 being opposite to the light entering surface 80s1 and facing the side surface 30s1 of the light guide panel 30. The light emitting surface of the lens unit is made of a convex surface extending in the first direction. The lens unit 80 may be made of a plurality of lenses arrayed in the X direction or single lens extending in the X direction. The lens is an optical member of the light guide member transmitting the visible light, the optical member having a function of scattering or converging the light by using difference in a refractive index. The lens unit 80 is one type of the light guide panel. However, in the present embodiment, the lens unit 80 and the light guide panel 30 arranged in the display region DA (see FIG. 3) will be explained to be distinguished from each other.

The lens unit 81 shown in FIG. 8 and the lens unit 80 shown in FIG. 7 are different from each other in a structure of the light entering surface 81s1. Note that a structure of the light emitting surface 81s2 of the lens unit 81 is the same structure as, for example, the light emitting surface 80s2 of the lens unit shown in FIG. 7. In other words, in the case of the lens unit 81 shown in FIG. 8, a cross section of the lens unit 81 viewed on a Y-Z plane has a quadrangular shape. On the other hand, the light entering surface 80s1 of the lens unit 80 shown in FIG. 7 is a concave surface. In the case of the lens unit 81, as schematically illustrated as loss light LL81 in FIG. 8, a part of the light emitted from the lens unit 81 travels straight from the side surface 30s1 of the light guide panel 30 toward the side surface 30s2, and does not reach the front surface 30s and the back surface 30b but reaches the side surface 30s2. This loss light LL81 does not reach the liquid crystal layer LQL shown in FIG. 5, and therefore, does not contribute to the light for the image display. The light not contributing to the display as described above is referred to as loss light below.

In order to efficiently improve the luminance of the display apparatus, it is preferable to decrease the loss light. The decrease of the loss light increases the light quantity contributing to the display, and therefore, can improve the efficiency of the luminance with respect to power input to the display apparatus. If the luminance efficiency can be improved, an effect such as improvement of the quality of the display image due to the luminance improvement or reduction of power consumption can be expected.

In the case of the lens unit 80 of the present embodiment shown in FIG. 7, the light entering surface 80s1 is the concave surface, and therefore, quantity of the loss light LL81 (see FIG. 8) traveling straight toward to side surface 30s2 can be made less than that of the case of the lens unit 81 shown in FIG. 8. According to the present inventor's studies, a tilt angle θ1 of the light propagating in the light guide panel 30 is preferably about +5 to +6 degrees or −5 to −6 degrees. The tilt angle θ1 of the light is defined as a tile angle from a normal line direction (the Y direction in FIG. 7) of the side surface 30s1 of the light guide panel 30. If the tilt angle θ1 of the light is equal to or larger than 5 degrees, a state almost without the loss light LL81 shown in FIG. 8 can be achieved. On the other hand, if the tilt angle θ1 of the light is large to be nearly 90 degrees, the light is reflected in vicinity of the side surface and therefore, the light-source light is difficult to reach the side surface 30s2. If the light entering surface 80s1 is a V-shaped concave surface in the cross-sectional view while a point light source exists on a line of extension of center of the concave surface in the Y direction, when a tilt angle θ2 (that is a tilt angle with respect to the Z direction) of the light entering surface 80s1 that is the V-shaped tile surface is 12 degrees, the above-describe state of the tilt angle θ1 of the light can be achieved. The concave surface shape shown in FIG. 7 can be expressed as follows. The concave surface shown in FIG. 7 has an apex at which two tile surfaces cross each other.

Figure 9:
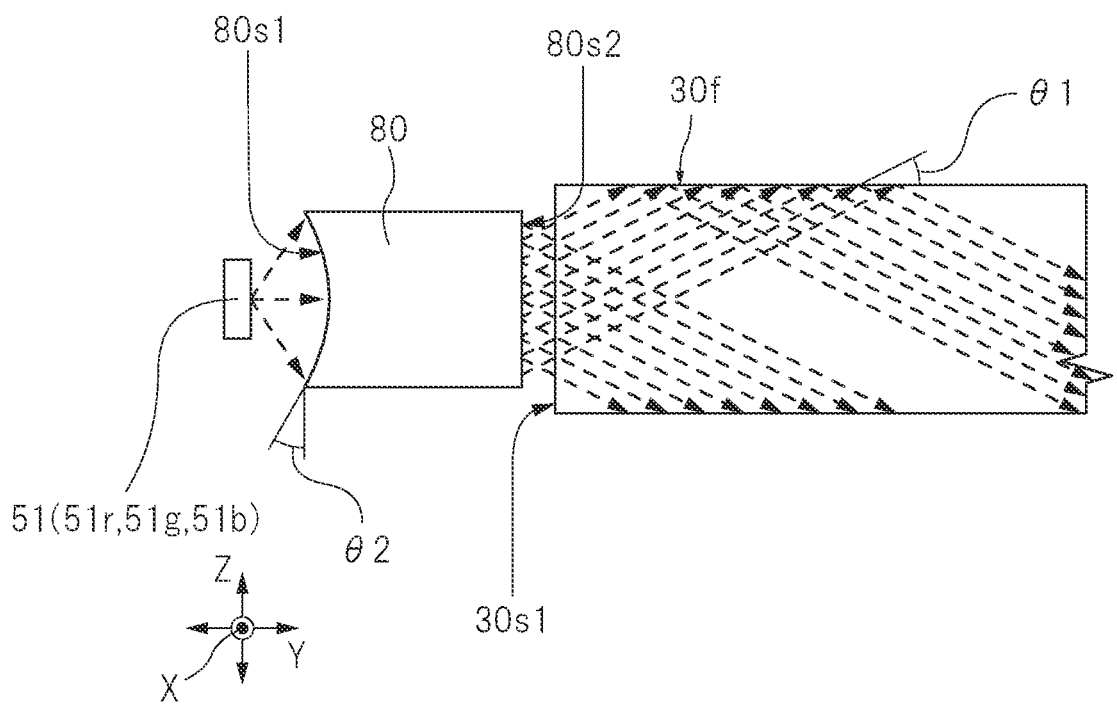
FIG. 9 is a cross-sectional view showing a modification example of the lens unit shown in FIG. 7.

Note that values of the tilt angle θ2 of the light entering surface 80s1 of the lens unit 80 includes not only the above-described value but also various modification examples. As a modification example, as shown in FIG. 9, the cross-sectional shape of the light entering surface 80s1 may be a curved concave surface. FIG. 9 is a cross-sectional view showing a modification example of the lens unit shown in FIG. 7. In comparison with the modification example of FIG. 9, the concave surface of the example shown in FIG. 7 can be interpreted as an uncurved concave surface because of extending straight.

Figure 10:
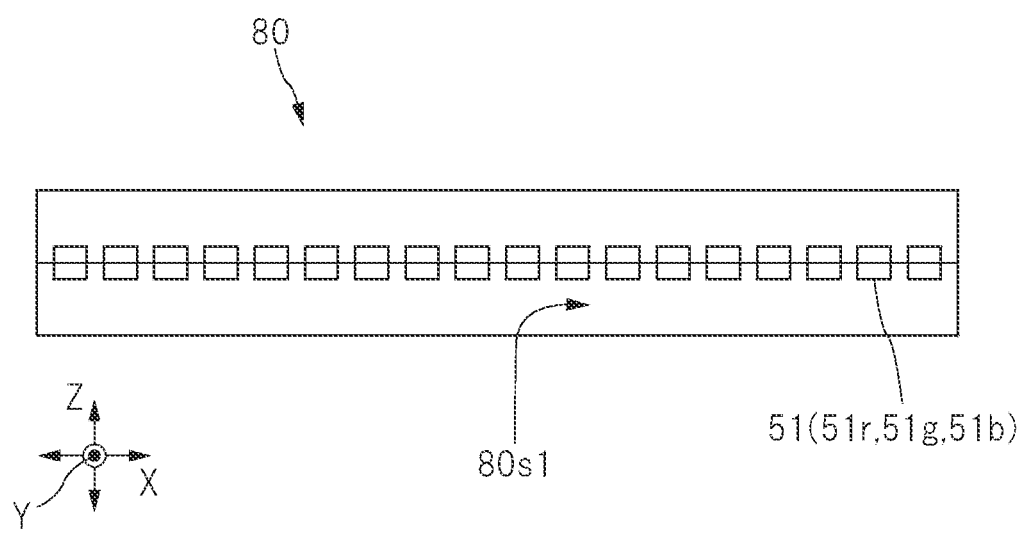
FIG. 10 is a plan view in a case of viewing of the light entering surface of the lens unit shown in FIG. 7 through an LED element.

Next, a plan surface shape of the light entering surface 80s1 shown in FIG. 7 will be explained. FIG. 10 is a plan view of the light entering surface of the lens unit shown in FIG. 7 viewed through an LED element. As shown in FIG. 10, the light entering surface 80s1 of the lens unit 80 is a concave surface extending in the X direction that is the arrangement direction of the plurality of light emitting diode elements 51. The shape of the light entering surface 80s1 of the present embodiment is formed in consideration of control for the light propagation direction in the Z direction that is the thickness direction of the display panel. Therefore, the shape of the light entering surface 80s1 is a trench-like shape extending in the X direction. In this manner, the loss light LL81 (see FIG. 8) can be decreased at any position in the same way in the X direction. Even if the light entering surface 80s1 is the curved concave surface as shown in FIG. 9, the curved concave surface has a shape extending in the X direction as similar to the example shown in FIG. 10.

Modification Example

Figure 11:
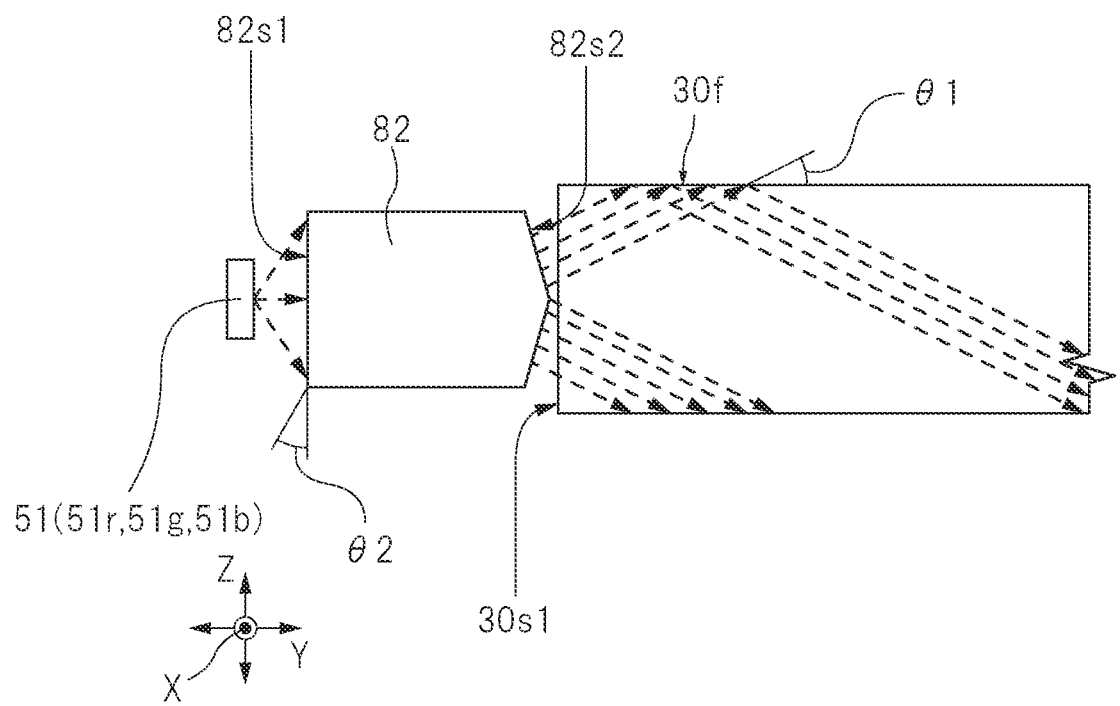
FIG. 11 is a cross-sectional view showing another modification example of the lens unit shown in FIG. 7.
Figure 12:
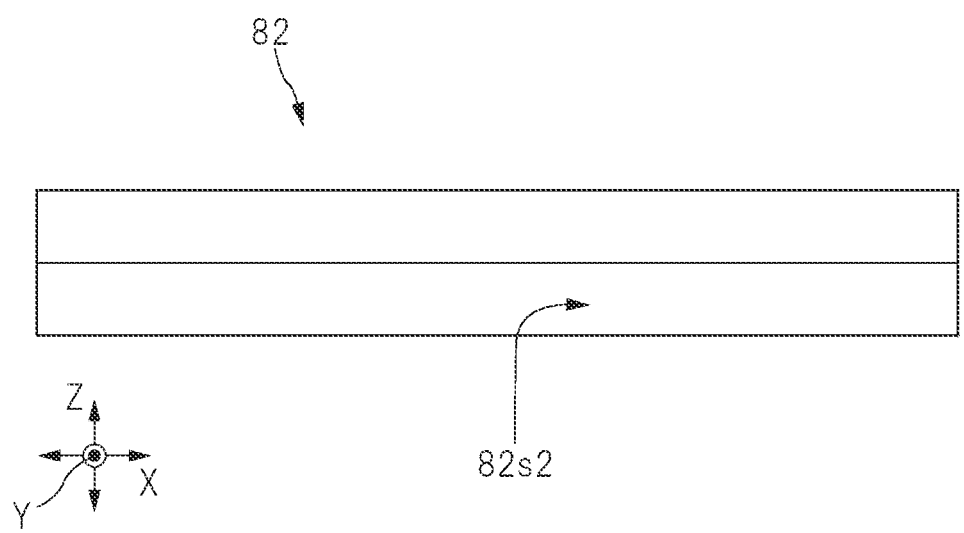
FIG. 12 is a plan view in a case of viewing of the lens unit shown in FIG. 11 from a light guide panel side.
Figure 13:
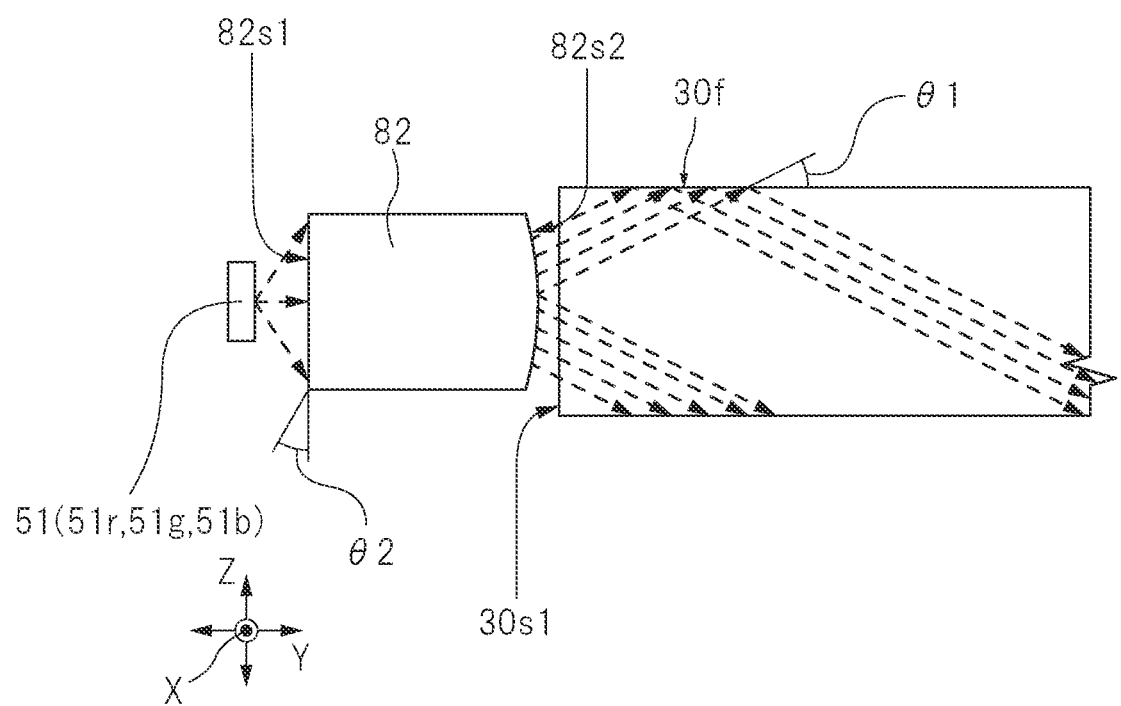
FIG. 13 is a cross-sectional view showing a modification example compared to FIG. 11.

Next, a modification example compared to the lens unit shown in FIGS. 7, 9 and 10 will be explained. FIG. 11 is a cross-sectional view showing another modification example of the lens unit shown in FIG. 7. FIG. 12 is a plan view in a case of viewing of the lens unit shown in FIG. 11 from a light guide panel side. FIG. 13 is a cross-sectional view showing a modification example compared to FIG. 11. Although each of FIGS. 11 and 13 is the cross-sectional view, hatching is omitted in order to make the light path easy to be recognized. The following explanation will be made while taking an example in which the light guide panel 30 is arranged on the front surface side of the substrate 20, separately from the substrate 20 as seen in the display panel P1 shown in FIG. 5. Note that the following explained technique is also applicable to a usage case of the substrate 20 regarded as a light guide panel without the light guide panel 30 as seen in the display panel P2 shown in FIG. 6. In this case, the lens unit 80 shown in FIG. 5 is arranged between the light source unit 50 and the substrate 20 shown in FIG. 6. Further, this case is applicable even when the light guide panel explained below is interpreted as the substrate 20.

A lens unit 82 shown in FIG. 11 (or FIG. 13) is different from the lens unit 80 shown in FIG. 7 in shapes of a light entering surface 82s1 and a light emitting surface 82s2. The lens unit 82 has the light entering surface 82s1 facing the light source unit 50; and the light emitting surface 82s2 being opposite to the light entering surface 82s1 and facing the side surface 30s1 of the light guide panel 30. This point is the same as that of the lens unit 80 shown in FIG. 7. The lens unit 82 shown in FIG. 11 is different from the lens unit 80 shown in FIG. 7 in that the light emitting surface 82s2 is a convex surface extending in the X direction. Also, the lens unit 82 shown in FIG. 11 is different from the lens unit 80 shown in FIG. 7 in that the light entering surface 82s1 is not the concave surface. The modification example shown in FIG. 13 is different from the lens unit 82 shown in FIG. 11 in that the light emitting surface 82s2 is a curved surface. Other points are the same as those of FIG. 11. The convex surface shape shown in FIG. 11 can be expressed as follows. The convex surface shown in FIG. 11 has an apex at which two tile surfaces cross each other.

As described above, in order to improve the luminance efficiency of the display panel, an angle of the light propagating the light guide panel 30 only needs to tilt from the Y direction. Therefore, as seen in the lens unit 82 shown in FIGS. 11 and 13, a structure with the light emitting surface 82s2 being the convex surface is also effective. When the lens unit is formed by cast molding, a structure with the light entering surface 80s1 being the concave surface as seen in the lens unit 80 shown in FIGS. 7 and 9 can be easier to be formed. On the other hand, in a case of a structure with the light emitting surface 82s2 being the convex surface as seen in the lens unit 82 shown in FIGS. 11 and 13, the light propagation direction is controlled at a position near the light guide panel 30, and therefore, it is easier to control the light propagation direction.

In the above-described embodiments, attention is paid to the decrease of the loss light not reaching the liquid crystal layer. Therefore, a slit or a prism extending in the Z direction is not formed in the light entering surface 80s1 shown in FIGS. 7 and 9 and the light emitting surface 82s2 shown in FIG. 11. However, as a modification example, the slit or the prism extending in the Z direction is occasionally formed in the light entering surface 80s1 (or the light emitting surface 80s2) of the lens unit 80 shown in FIGS. 7 and 9 and the light emitting surface 82s2 (or the light entering surface 82s1) of the lens unit 82 shown in FIGS. 11 and 13. In this modification example, the slit or the prism extending in the Z direction contributes to the diffusion of the light in the direction along the X-Y plane shown in FIG. 3. On the other hand, the concave surface (the light entering surface 80s1) shown in FIGS. 7 and 9 and the convex surface (the light emitting surface 82s2) shown in FIGS. 11 and 13 contribute to the decrease of the loss light as described above. In other words, each of the concave surface shown in FIGS. 7 and 9 and the convex surface shown in FIGS. 11 and 13 extends in the X direction, and therefore, has a different function from those of the slit or the prism extending in the Z direction.

The embodiments and the typical modification examples have been explained above. However, the above-described techniques are applicable to various modification examples other than the exemplified modification examples. For example, the above-described modification examples may be combined.

Various modification examples and alteration examples could have been easily anticipated within the scope of the concept of the present invention, by those who are skilled in the art, and it would be understood that these various modification examples and alteration examples belong to the scope of the present invention. For example, the ones obtained by appropriate addition, removal, or design-change of the components to/from/into each of the above-described embodiments by those who are skilled in the art or obtained by addition, omitting, or condition-change of the step to/from/into each of the above-described embodiments are also within the scope of the present invention as long as they include the idea of the present invention.

The present invention is applicable to a display apparatus and an electronic device embedded in the display apparatus.

What is claimed is:

1. A display apparatus comprising:
   a first substrate including a first front surface and a first back surface opposite to the first front surface;
   a liquid crystal layer arranged on the first front surface of the first substrate;
   a light guide panel including a first surface facing the first front surface, a second surface opposite to the first surface, and a first side surface crossing the first surface and the second surface;
   a light source unit including a plurality of light emitting diode elements arranged in a first direction at a position facing the first side surface of the light guide panel; and
   a lens unit arranged between the light guide panel and the light source unit,
   wherein the light source unit, the lens unit and the light guide panel are arranged in a second direction crossing the first direction,
   the lens unit includes:
      a light entering surface facing the light source unit; and
      a light emitting surface being opposite to the light entering surface and facing the first side surface of the light guide panel, and
   the light entering surface of the lens unit is a concave surface extending in the first direction.

2. The display apparatus according to claim 1, wherein the concave surface of the lens unit is a curved surface.

3. The display apparatus according to claim 1, wherein the light emitting surface of the lens unit is a convex surface extending in the first direction.

4. The display apparatus according to claim 3, wherein the convex surface of the lens unit is a curved surface.

5. The display apparatus according to claim 1, wherein the light entering surface is a V-shaped concave surface.

* * * * *